(12) United States Patent
Tchigevsky et al.

(10) Patent No.: US 10,924,990 B2
(45) Date of Patent: Feb. 16, 2021

(54) ACCESS POINT CONNECTIVITY OPTIMIZATION

(71) Applicant: Intel IP Corporation, Santa Clara, CA (US)

(72) Inventors: Izoslav Tchigevsky, Portland, OR (US); Venkata R. Vallabhu, Portland, OR (US); Bahareh Sadeghi, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 132 days.

(21) Appl. No.: 15/476,366

(22) Filed: Mar. 31, 2017

(65) Prior Publication Data

US 2018/0288695 A1 Oct. 4, 2018

(51) Int. Cl.
*H04W 48/20* (2009.01)
*H04W 4/38* (2018.01)
*H04W 4/70* (2018.01)
*H04W 84/12* (2009.01)

(52) U.S. Cl.
CPC ............. *H04W 48/20* (2013.01); *H04W 4/38* (2018.02); *H04W 4/70* (2018.02); *H04W 84/12* (2013.01)

(58) Field of Classification Search
CPC ..... H04W 48/20; H04W 8/005; H04W 36/08; H04W 72/04; H04W 4/70; H04W 88/08
See application file for complete search history.

(56) References Cited

U.S. PATENT DOCUMENTS

| | | | |
|---|---|---|---|
| 2007/0147317 A1* | 6/2007 | Smith ................... | H04W 48/18 370/338 |
| 2016/0037384 A1* | 2/2016 | Soundararajan ...... | H04W 28/08 455/453 |
| 2016/0100278 A1* | 4/2016 | Stephens ................. | H04L 29/06 455/41.1 |
| 2017/0337091 A1* | 11/2017 | Liu ........................ | G06F 9/5038 |
| 2018/0184401 A1* | 6/2018 | Ghosh ................... | H04W 72/04 |

* cited by examiner

*Primary Examiner* — Andrew Lai
*Assistant Examiner* — M Mostazir Rahman
(74) *Attorney, Agent, or Firm* — Eversheds Sutherland (US) LLP

(57) ABSTRACT

This disclosure describes methods, apparatuses, and devices related to optimizing connectivity between devices. A device is disclosed that may determine first information received from a client device, wherein the first information comprises at least one of an authentication request, an association request, or pre-association discovery request, and wherein the first information includes an indication of a first device type. The device may further determine a first virtual access point from a group of virtual access points associated with the wireless device based at least in part on the first device type, wherein the first virtual access point has first wireless resources. The device may further associate the client device with the first virtual access point. The device may further cause to send to the client device data based at least in part on the first wireless resources.

19 Claims, 9 Drawing Sheets

ACCESS POINT CONNECTIVITY OPTIMIZATION

TECHNICAL FIELD

This disclosure generally relates to systems and methods for wireless communications and, more particularly, systems and methods resource management optimization for wireless communication.

BACKGROUND

The ubiquitous nature of devices with wireless capabilities has led to an increase in the amount of memory required by access points (APs) to support the ever increasing volume of these ubiquitous devices. Traditionally, the devices with wireless capabilities included processors found in larger computing devices such as televisions, desktop computers, laptops, tablets, or mobile phones. However, with the advent of increased computing power in smaller form factors, such as microprocessors, smaller devices requiring less computational power than the aforementioned devices, such as wearables, lightbulbs, thermostats, and light switches are now being equipped with wireless hardware that enable these devices to communicate with wirelessly with APs much like the traditional devices. As a result, the number and type of resources that APs must provide has increased exponentially with the number of new devices, thereby requiring APs to determine how best to optimize the allocation of the different types of resources.

DETAILED DESCRIPTION

Figure 1:
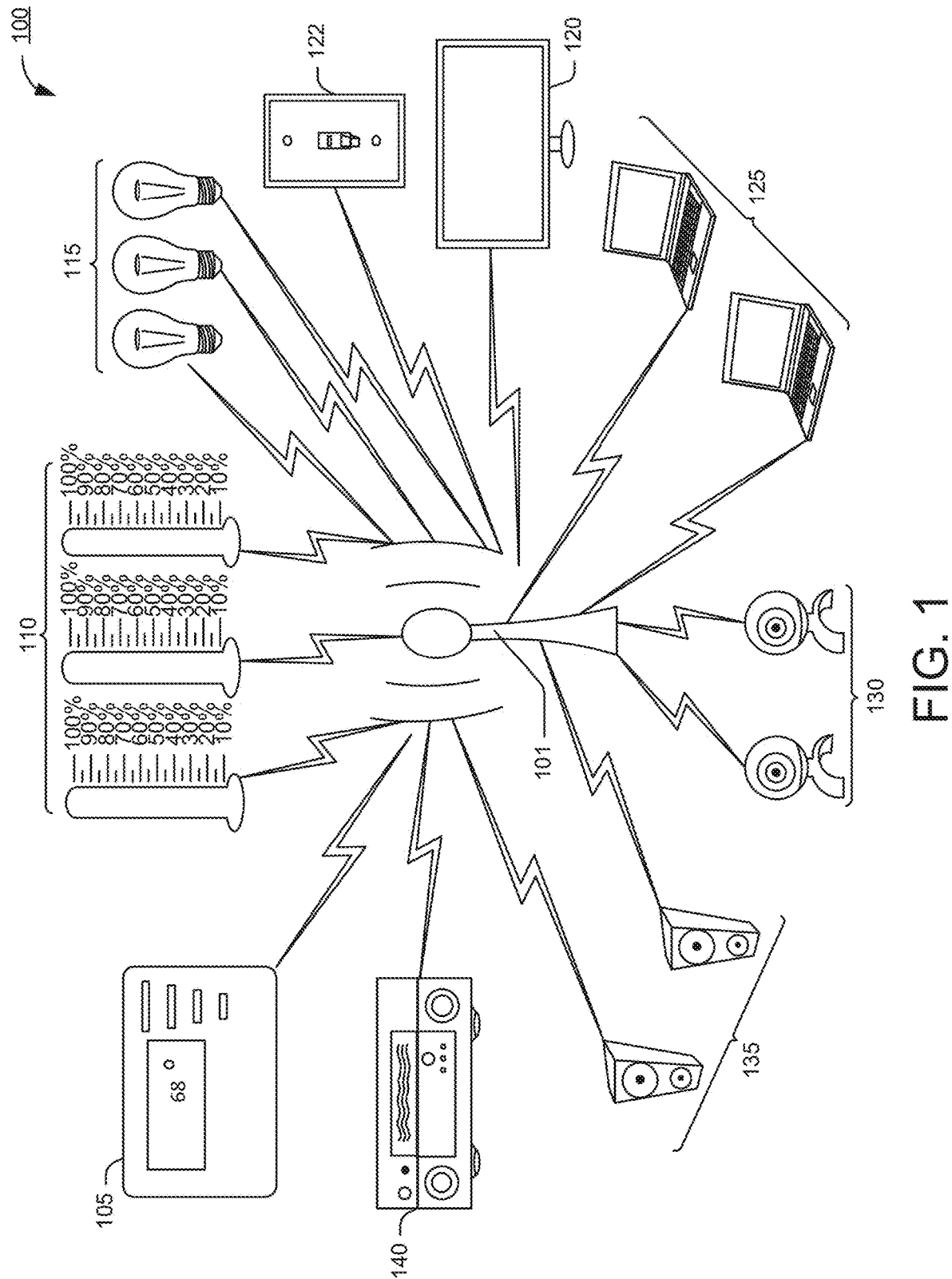
FIG. 1 shows an exemplary Internet-of-Things (IoT) network environment with an access point (AP).

The exemplary systems, methods, and devices optimize the allocation of resources (e.g., bandwidth, channel occupancy and congestion, and/or channel reservation times) to a variety of other devices executing applications requiring different allocations of the resources. These devices allocating the resources may be access points (APs) and the devices executing the applications may be client devices that connect to the APs to access one or more network devices (e.g., an application hosted on a server). Because the applications require different allocations of the resources that may vary widely from one device to another, the systems, methods, and AP devices may optimize the allocation of the resources by partitioning certain hardware resources of the AP into a plurality of virtual access points (VAPs) based on the grouping of the client devices requiring the same or similar resources.

Accordingly, in certain embodiments the systems, methods, and devices presented herein, implement solutions to the problem of inequitable allocation of buffer resources in the AP devices and inequitable allocation of client device resources (e.g., bandwidth, channel occupancy and congestion, and/or channel reservation times) by optimizing the utilization of resources in the AP devices for the associated client devices, and in particular one or more medium access control (MAC) layer entities implemented by the processors in the AP devices and the client devices.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Conventional Wi-Fi devices (e.g., APs) support a limited number of clients. One reason is that various standards (e.g., the IEEE 802.11 standards) specify that APs provide some basic service for all Wi-Fi stations (STAs), (e.g., Wi-Fi client devices). For instance, an AP can buffer traffic that comes from external networks or other client devices to a specific client device STA, if this STA is in power save mode. Thus, an AP may need to be prepared for worst case scenarios. For example, the APs may need to have enough buffers to maintain data arriving at a maximal rate (e.g., approximately 1 Gb/s) for maximal number of supported clients (e.g., 32), and for at maximal supported delivery traffic indication message (DTIM) period (e.g., approximately 300 milliseconds). This may require at least a large amount of random-access memory (RAM) to be allocated for this purpose. For example, with the data rates, number of client devices, and DTIM periods given in the example, approximately 400 MB of RAM may need to be allocated by the transmitting AP.

Approaches of enabling an AP to support client devices are often directed to pre-allocating a large (possibly maximal) amount of potentially required resources, for example, buffer space in the device. However, such approaches can limit the device's ability to support a large number of devices. For instance, in the above example, the AP with a certain amount of RAM can only support a limited number of devices if each device is allocated 400 MB of its RAM. With the increase of the Internet-of-Things (IoT) devices and the exponential increase in number of connected client devices, this can negatively impact the user experience (e.g., by requiring that the user have multiple APs, for example, in their homes, or by limiting the number of connected devices) and/or increase the cost of devices.

Often the traffic requirements of client devices in a wireless network can be predictably analyzed by a device (e.g., a connected AP) based on the services they provide.

Determining the services provided by the client device STAs can be a part of the discovery process, for example, the discovering process used in Wi-Fi Direct, WI-FI Direct Services (WFDS) Application Services Platform (ASP) frameworks, and ASP2 programs. For example, a device comprising an AP (referred to herein as a smart AP) for a smart home can determine the traffic requirements of client devices (e.g., various STAs) based on the services they provide; the information the device learns as part of the discovery process can then be used to allocate the required resources for the client devices. This is in contrast to conventional systems and methods, in which the device allocates a default buffer amount, for example, the maximum available in memory, for any given client device.

FIG. 1 is a conventional exemplary Internet-of-Things (IoT) network environment 100. Specifically, FIG. 1 shows a diagram of a conventional exemplary wireless device 101 (interchangeably referred to as an AP or a smart AP herein) that can send and receive data with various wireless client devices through different mechanisms. IoT has led to an increased amount of wireless client devices requesting service from the wireless device 101, as illustrated in FIG. 1. For example, a smart thermostat 105 may require several devices to be connected to the wireless device 101, such as the smart thermostat 105 itself and one or more temperature or humidity sensors 110 communicatively coupled to the smart thermostat 105. In a smart home, each smart lightbulb 115 can be a client device. Similarly, each smart speaker 135 in the house can be a client device (e.g., each speaker in a six speaker system can be a client device). Various other devices can also be a part of the IoT network environment 100, including but not limited to, the smart television 120, the laptops 125, the cameras 130, the stereo receiver 140, the speakers 135, the light switch 122 and the like.

Different client devices can exhibit different behaviors, which results in the different client devices generating different traffic types (patterns), requiring different data rates and/or bandwidths, and having different duty cycles. The different client devices may also have different power saving capabilities which influences the duty cycle and traffic patterns. Some of the different client devices may require a continuous connection, whereas others may require intermittent connections. The different client devices may also require different signaling optimizations. However, conventional APs may exchange data with the different client devices using a uniform data rate and/or uniform bandwidth, even though some of the different client devices may not require the same data rates and/or bandwidths as other different client devices. Conventional APs may attempt to maintain a continuous connection with all of the different client devices, even when some of the different client devices may not require a continuous connection. Conventional APs may also apply the same signaling optimizations to all of the different client devices, even though all of the different client devices do not require the same signaling optimizations. Because conventional APs uniformly apply the same service resources to different client devices, AP resources (e.g., buffer space, dedicated data queues per client device, over-the-air occupancy and congestion, and/or over-the-air time reservation for client activities) may be improperly allocated by the AP in order to provide the service resources to the different client devices. As explained above, and in the example given below, because the conventional AP allocates the same AP resources for each client device, then a smaller number of client devices can use the available service resources, as opposed to when an intelligent allocation of AP resources is implemented by classifying the different client devices, as different client types, based on the behavior of the different client devices as explained below. With reference FIG. 1, as in IoT network environment 100, conventional AP devcie 101 uniformly allocates resources to all client devices regardless of the requirements of the applications executing on the devices. This may result in the inefficient allocation of the resources to client devices. For example, sensors 110 may not require the same bandwidth as smart television 120 to transmit and receive from device 101, because the amount of data (cardinality of data) transmitted between sensors 110 and device 101 may be significantly smaller in size than the amount of data transmitted between smart television 120 and device 101. This is because the data (for example, motion picture frames and audio data) associated with smart television 120 has a greater cardinality than that of the cardinality of the data (for example, still images and text data) associated with the sensors 110. Accordingly, allocating the same bandwidth to both smart television 120 and sensors 110 is an inefficient use of the bandwidth. The wasted bandwidth could be used by additional devices that are unable to connect to the device 101, because the bandwidth resources have been inefficiently allocated to the client devices connected to device 101. That is, because there is only a finite amount of bandwidth, or other resources, to be allocated to client devices, the number of client devices that can connect to device 101 is limited. In addition to the inefficient allocation of resources to the client devices, the buffers in the physical or virtual memory of device 101 may be used inefficiently. That is, a buffer of the same size may be created to buffer data for smart television 120 and sensors 110 even though the duty cycle of smart television 120 is different from the duty cycle of sensors 110. Accordingly, the buffer for device 101 will continue to buffer data until sensors 110 cycle on (wake up) and then may transmit the buffered data to sensors 110. That means that device 101 may have to buffer more data than that of smart television 120 when the sensors 110 cycle off (is asleep) because data may continue to be received, from a network server destined for sensors 110, while sensors 110 are asleep but because sensors 110 are asleep device 101 cannot transmit the received data to sensors 110. As a result the buffer associated with the received data for sensors 110 can increase and potentially occupy more space than that of smart television 120, because as data is received, that is destined for smart television 120, the buffer associated with smart television 120 will only buffer an amount of data necessary to maintain a connection between a server hosting content (e.g., a television show) being streamed to smart television 120. Because data is not buffered in the buffer associated with smart television 120 when the television is off, the buffer associated with smart television 120 may only buffer the minimum data necessary to keep a stream active between the server and smart television 120 when the television is on. Consequently, the buffer associated with smart television 120 may have a smaller cardinality than the buffer associated with sensors 110 because the buffer associated with smart television 120 will empty faster than the buffer associated with sensors 110 due to smart television 120 having a higher duty cycle than sensors 110. Smart television 120 may have a higher duty cycle than sensors 110 because the duty cycle of smart television 120 is a proportion of time that a connection is maintained between the server and smart television 120 relative to the amount of time that smart television 120 is on. Accordingly, the duty cycle for smart television 120 may effectively be 100%, because the connection between the server and smart television 120 will only exist when smart television 120 is on. Sensors 110 however may have a duty cycle that is less than 100%, and because the buffer associated with sensors 110 may continue to buffer data while sensors 110 are asleep, the buffer will not empty as fast and therefore can be larger than that of the buffer associated with smart television 120.

Figure 2:
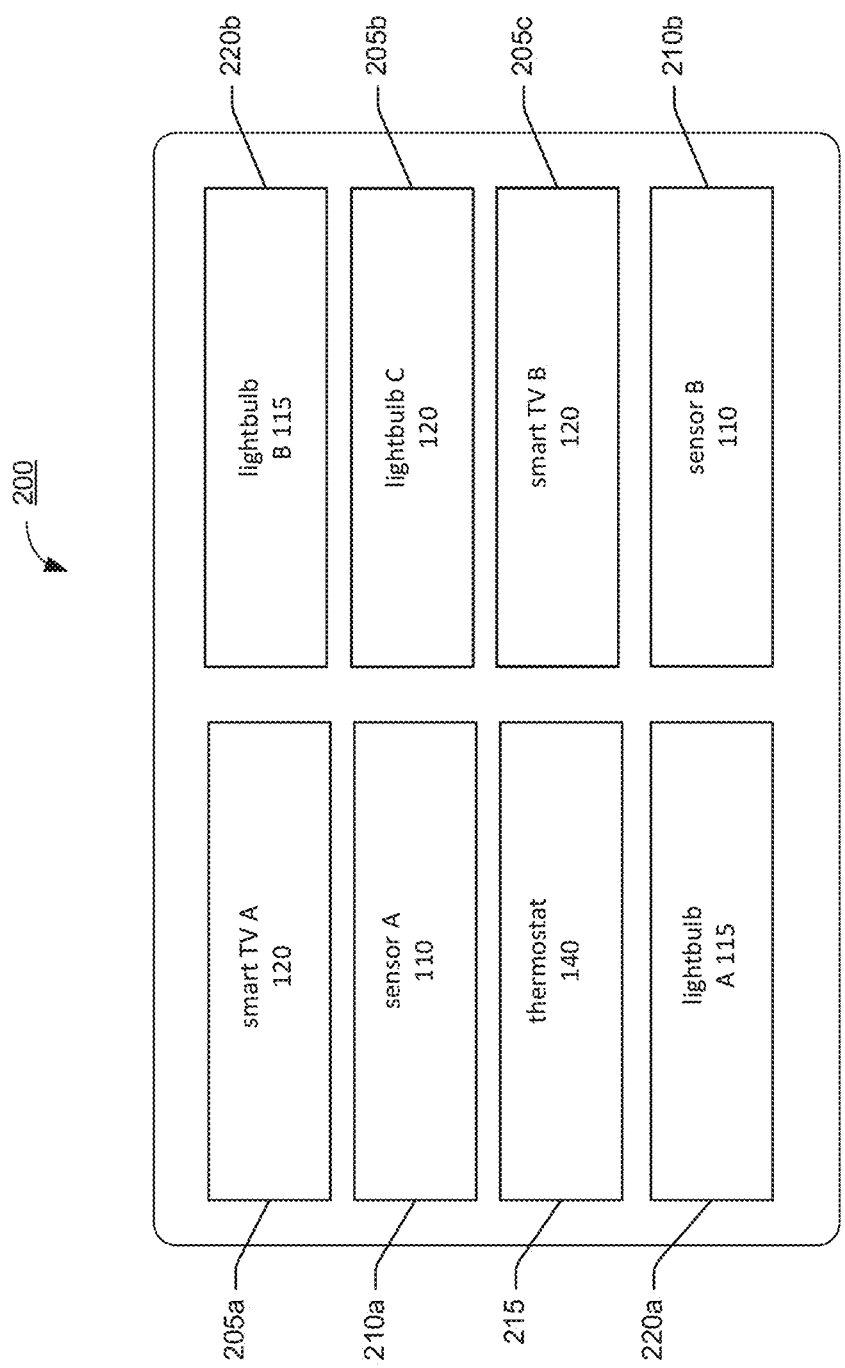
FIG. 2 shows a diagram of AP resource allocation for various client devices.

FIG. 2 shows a diagram of AP resource allocation for conventional client devices, such as AP device 101 in FIG. 1. Diagram 200 is an illustrative representation of how an exemplary conventional wireless device (AP) may allocate its available resources to service client devices in an undifferentiated manner with respect to client device usage (represented by blocks 205*a*, 210*a*, 215, 220*a*, 220*b*, 205*b* 205*c*, and 210*b*). In other words, blocks 205*a*, 210*a*, 215, 220*a*, 220*b*, 205*b*, 205*c*, and 210*b* represent the available resources of the AP for a given client device (for example, smart TV A 120, thermostat 140, sensor A 110, smart lightbulb A 115, lightbulb B 115, lightbulb C 120, smart TV B 120, sensor B 110 of AP device 101 in FIG. 1), may be pre-allocated, distributed, and/or used equally for all client devices. For instance, an example low resource-usage device (for example, a smart lightbulb 115) may have an equal pre-allocated share of AP resources (for example, channel bandwidth, memory, priority treatment of the client device, buffer space, and the like) as more resource-consuming second type of device (for example, the smart television 135). Accordingly, different types of devices (for example, type 1-type 4 shown in the figure) are given the same resource allocation by the AP 101.

Figure 3:
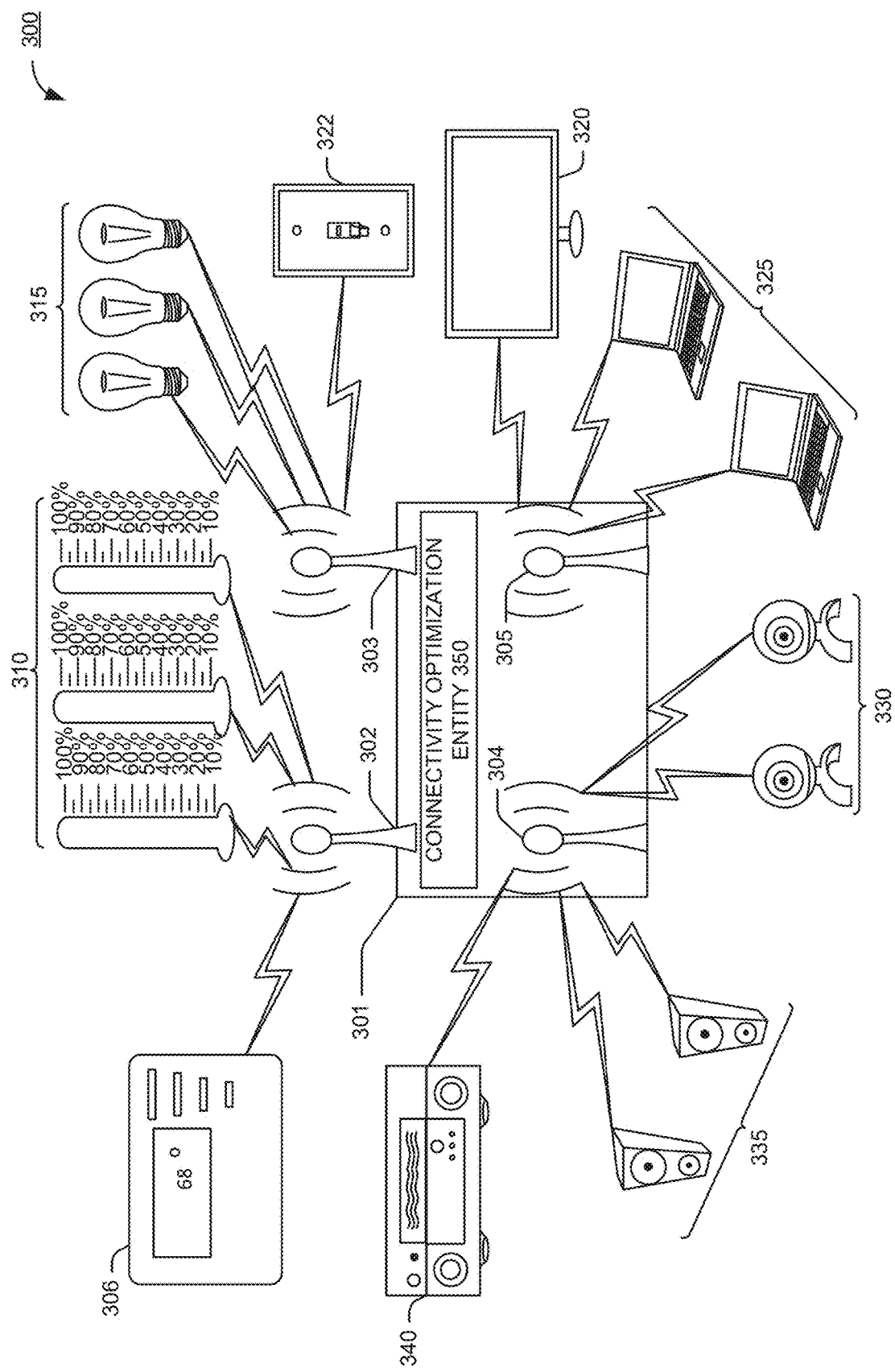
FIG. 3 shows an exemplary Internet-of-Things (IoT) network environment with of virtual APs (VAPs), in accordance with one or more example embodiments of the disclosure.

FIG. 3 shows an exemplary Internet-of-Things (IoT) network environment with of virtual APs (VAPs), in accordance with one or more example embodiments of the disclosure. In the instant disclosure wireless device 301 may comprise one or more processors, hardware, middleware, and/or software implementing one or more of the layers of the IEEE 802.11 Wi-Fi standard. In particular, wireless device 301 may implement a connectivity optimization entity (e.g., connectivity optimization entity 350) that may implement one or more of the functions in the embodiments disclosed herein. In some embodiments, connectivity optimization entity 350 may be implemented by the one or processors in the Media Access Control (MAC) layer, in the Physical (PHY) layer, or may be implemented as a cross layer design between the MAC layer and the PHY layer. In some embodiments, the connectivity optimization entity 350 may be implemented at a network (NWK) layer, or may be implemented as a cross layer design between the NWK layer, MAC layer, and PHY layer.

By classifying and assigning the different client devices to different client types, the AP can optimize the allocation of its resources in such a way so as to allocate more AP resources to ensure that the client devices requiring more service resources, than what is conventionally provided, receive an adequate amount of service resources, and that the client devices requiring less service resources, than what is conventionally provided, receive an adequate amount of service resources.

The wireless device 301 (interchangeably referred to as an AP or a smart AP herein) comprising one or more virtual wireless devices (interchangeably referred to as a virtual AP or smart virtual AP herein). In some embodiments, wireless device 301 may comprise virtual wireless devices 302-305. A subset of wireless devices 302-305 may provide a wireless connection to a subset of client devices 306, 340, 335, 330, 325, 320, 322, 315, or 310. For example, virtual wireless device 302 may provide a wireless connection to thermostat 306 and sensors 310, virtual wireless device 303 may provide a wireless connection to lightbulbs 315 and light switch 322, virtual wireless device 304 may provide a wireless connection to receiver 340, speakers 335, and cameras 330, and virtual wireless device 305 may provide a wireless connection to cameras 330, laptop 325, and smart television 320.

IoT has led to an increased amount of WiFi clients requesting service from wireless devices such as wireless device 301. For example, a smart thermostat 306 may require several devices to be connected to WiFi, such as one or more sensors 310. For instance thermostat 306 may adjust a setting on a Heating Ventilation and Air Conditioning (HVA) unit (not pictured) based on one or more sensor measurements received from one or more sensors 310 dispersed throughout a building, via a virtual access point (VAP), such as VAP 302. That is smart thermostat 306 may receive the one or more sensor measurements from one or more sensors 310, via VAP 302, and may also transmit one or more control signals to the thermostat 306, via VAP 302, that may cause the HVAC unit to adjust the temperature or humidity in the building.

As mentioned above, different client devices may have different traffic patterns. Some client devices may require fewer resources from wireless device 301, allowing wireless device 301 to support a much larger number of client devices (e.g., up to hundreds of client devices) without substantially increasing the resource footprint of wireless device 301 itself, by allocating resources to the different client devices based on the resource needs of the client device so that devices that need less are allocated less, thereby leaving resource for other (e.g., more) devices. This may be done, for example, by classifying the different client devices into types based on one or more of traffic type, data rate, duty cycle, power saving capabilities, connection type (e.g., continuous or intermittent), and/or signal optimizations of the different client devices. At the wireless AP device, clients of the same type may be associated with the same VAP. Each VAP may allocate resources uniformly to the clients with which it is associated, wherein the resources allocated may be aligned with the needs of that client type. For instance, all lightbulbs may be assigned to the same VAP. While that VAP may assign the same or similar resources to each lightbulb, the amount allocated to each is commensurate with the resource needs of a lightbulb. This allows the wireless device to service more clients because the resources of the wireless device are more efficiently allocated. Similarly, as examples, smart TVs may be a different client type based on the resources needed for its operation, which will likely be significantly more than that needed by an individual lightbulb, and temperature/humidity sensors may be a yet another client type with yet a different resource need.

The systems and methods herein disclose a wireless device that may use service information to allocate and manage buffers and resources for client devices (e.g., client devices 306, 340, 335, 330, 325, 320, 322, 315, or 310 in FIG. 3). In some embodiments, service information can be available to wireless AP device 301 at the time of association of a client device. In another embodiment, the service information can be available to wireless AP device 301 when discovery information is passed via wireless AP device 301 to the client device searching for particular services. The wireless device can use this discovery information to assign or associate each client to a VAP that is configured for a type of client based on the resource needs of clients of that type. Once associated with a particular VAP, appropriate resources may be allocated to the client device either statically (e.g., at the time of client device association) or dynamically (e.g., each time new information about the provided service becomes available). This can enable the optimization of buffers and other resources at the wireless AP device, and a reduction in the hardware cost of the wireless device.

One improvement of the disclosed systems and methods is that they can enable lower cost network access devices, such as an AP or smart AP, to serve more client devices, by creating a plurality of VAPs. A plurality of VAPs enables more power-efficient behavior of client devices (e.g., various IoT devices), which leads to less expensive implementation of those client devices in hardware and software, since, for example, the client devices can work with optimized wireless devices that have a plurality of VAPs, wherein each VAP may provide resources to client devices based on the requirements of the client devices. The allocation of resources by a VAP may be uniform to at least some of the client devices with which the VAP is associated, and/or it may be generally the same but based on the historical resource utilization of the respective individual client devices.

In various embodiments, client devices can make use of the fact that the wireless device is aware of the client device's behavior. For example, the client devices can avoid unnecessary over-the-air activities and thus preserve power. For example, unnecessary over-the-air activities can include transmitting "keep-alive" frames by the wireless device to the client device to maintain the operation of the client device, when "keep-alive" frames are not required to provide the services requested by the client device. That is, the wireless device may assign a client device to a certain class (also referred to herein as type) associated with a VAP that provides services to client devices that do not require "keep-alive" frames. An example of a client device that may not require "keep-alive" frames may be lightbulbs 315, because only a short command transmitted from a VAP servicing such client devices that do not require "keep-alive" frames, is all that is needed to turn a lightbulb on or off, or asses the remaining lifetime of any of lightbulbs 315, as compared to a streaming television show that may require several signaling commands to keep a connection alive between smart television 320 and another VAP routing packets from a server to smart television 320. The short command may comprise significantly less bits than the signaling commands, and therefore, the bandwidth and data rate requirements for lightbulbs 315 and smart television 320 may be significantly different. Accordingly, connectivity optimization entity 350 may allocate a certain amount of AP 301's resources for client devices with similar service requirements (e.g., bandwidth requirements or data rate requirements) in order to create two or more VAPs, each of which may support client devices with different service requirements. Returning to the example above of lightbulbs 315 and smart television 320, connectivity optimization entity 350 may allocate a first amount of resources to a first VAP for client devices with service requirements similar to those of lightbulbs 315 and may allocate a second amount of resources to a second VAP for client devices with service requirements similar to that of smart television 320. Accordingly, there may be different classes or types of devices that may be classified based on their service requirements and each of these different class or type classifications may be associated with a different VAP, and/or multiple class or type classifications that are similar may be associated with the same VAP in certain embodiments.

In various embodiments, the allocated resources and operational parameters on the wireless device and/or the client device can include, but not limited to, a buffer space (e.g., in memory), hardware for special handling of the client device (e.g., dedicated data queue hardware, hardware for offloading client device-specific processing from the device CPU to a device's WiFi card, and the like), or time reservations for over-the-air client device activities. For example, for client devices that have low power usage, the wireless device can optimize its own channel access, associated with a VAP providing services to the wireless device, in order to minimize the period that the client devices are in the awake or active mode. In various embodiments, operational parameters can include, but are not be limited to, one or more of a channel usage preference, a channel bandwidth usage, data rate, power usage, sleep/awake schedule, bandwidth, throughput, compression protocol, power requirements, and the like.

With reference back to FIG. 3, in the case of a smart lightbulb, the data exchanges between the wireless device and the smart lightbulb can comprise short commands. Hence, the wireless device may not need to allocate a large buffer in memory for smart lightbulb. The wireless device, or more particularly, connectivity optimization entity 350, may allocate to a first VAP a first set of resources of the wireless device for client devices with service requirements similar to that of the smart lightbulb, and may allocate to a second VAP a second set of resources of the wireless device for client devices with service requirements similar to that of the smart television. lightbulb These and similar considerations are captured in and accounted for by the wireless device, or more particularly, connectivity optimization entity 350, performing resource allocation, in accordance with the disclosed systems and methods.

In the disclosed systems and methods, information made available to a wireless device regarding the requested services and capabilities of the client devices can be used to optimize the resource allocation at the wireless device for the client devices. For example, if a client device is a lightbulb (e.g., lightbulb 315 of FIG. 3) attempting to connect to the wireless device, the wireless device may expect intermittent, low data-rate traffic, and connectivity optimization entity 350 may establish a connection between lightbulb 315 and a first VAP providing low data-rate traffic services. On the other hand, when a client device such as a security camera (e.g., security camera 330) attempts to connect to the wireless device, the wireless device may expect high data-rate traffic (e.g., video streaming), and connectivity optimization entity 350 may establish a connection between security camera 330 and a second VAP that can service high data-rate traffic.

The systems and methods disclosed herein can also be applicable to soft APs. A soft AP may be a smartphone, tablet, and the like, which can serve as an AP to connect with low-power client devices in household environments. In such cases, optimized buffer management for the devices on the smart phone and/or tablet can be important for optimizing user experience. In some embodiments, the soft AP may implement one or more of the functions of a connectivity optimization entity, similar to connectivity optimization entity 350, via an over the air firmware update that may be downloaded from an AP. The connectivity optimization entity in the soft AP may enable the soft AP to generate a plurality of virtual soft APs (VSAPs) similar to the VAPs in an AP, and may execute all or some of the functions of connectivity optimization entity 350.

Figure 4:
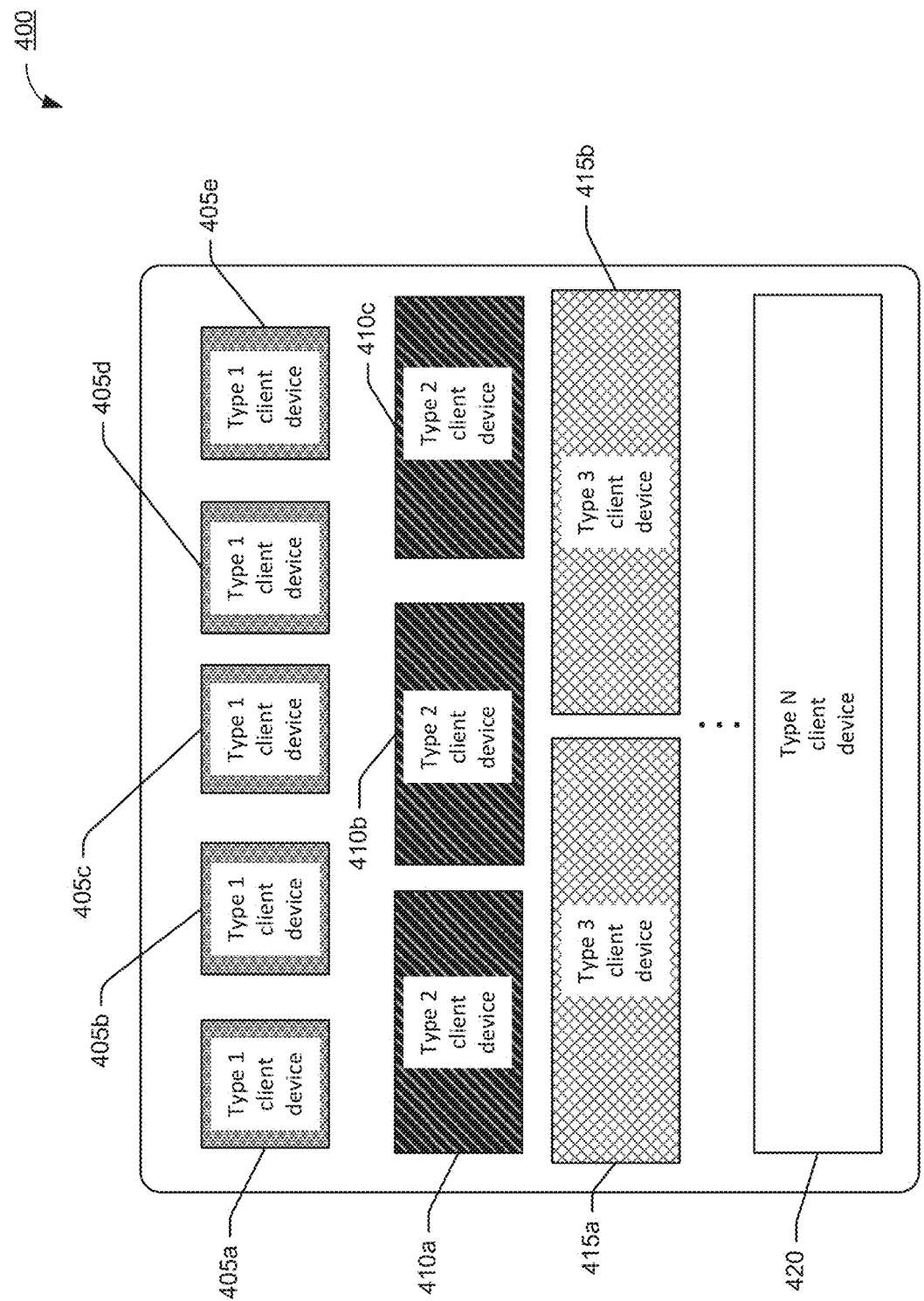
FIG. 4 shows a diagram of example optimized resource allocation for VAPs, in accordance with one or more example embodiments of the disclosure.

FIG. 4 shows a diagram of example optimized resource allocation for VAPs, in accordance with one or more example embodiments of the disclosure. The available resources of the VAP for a similar type of client devices (for example, client type 1), may be pre-allocated, distributed, and/or used differentially based on the client device type. Here, the available resources of the AP (represented by blocks 405-420) for the client devices can be divided more granularly based on the client device properties and needs, more so than in the situation described in FIG. 3. As such, given similar available resources (represented by blocks 405-420) for a wireless device, a larger number of client devices can be associated with the wireless device. Furthermore, the available resources (405-420) of the wireless device may be divided up by device type, and the device type may be based at least in part on an indication of resource consumption behavior. For example, a first set of client devices may be classified as a type 1 device, and each of the client devices in the first set of client devices (e.g., client 1) may be assigned resources in blocks 405a-e (e.g., smart lightbulbs). The client devices of the type 1 may be assigned to a first VAP.

The first set of client devices may not require the same amount of resources as a second set of client devices (e.g., client 2) which may be classified as a type 2 device, and may be assigned resources in blocks 410a-410c. The client devices of the type 2 may be assigned to a second VAP For example lightbulb connectivity optimization entity 350 may assign a first set of resources in blocks 405a-e to a set of smart lightbulbs, such as for example, smart lightbulbs 315, a second set of resources in blocks 410a-c to a set of sensors, such as for example, sensors 310, a third set of resources in blocks 415a-b to a set of speakers, such as for example, speakers 335, and may assign just one resource in block 420 to a receiver, such as for example, receiver 240. The different client devices (e.g., smart lightbulb, sensors, speakers, and receiver) may be classified according to a device type. In this example, the set of smart lightbulbs are classified as a type 1 client device, the set of sensors are classified as a type 2 client device, the speakers are classified as a type 3 client device, and the receiver is classified as a type 4 client device.

In one embodiment, the resources can comprise a dynamic buffer allocation in block 415 for a given client (for example, a type 3 client device). In various embodiments, this dynamic buffer allocation can comprise a larger resource allocation than either the client devices of a first device type or the client devices of a second device type. Similarly, additional device types can be supported by the resources provided by the wireless device. In one embodiment, a dynamic buffer allocation may be based at least in part on statistic collection and analysis for a given client device. In another embodiment, an allocation of buffer resources for legacy client devices (e.g., client devices that do not conform to the latest standards, and/or those client devices which do not transmit additional information to the wireless device besides basic connection information exchange) may be made available. In one embodiment, this allocation of buffer resources for legacy client devices may be a pre-determined amount that is static and can be changed by a user, for example, a user changing a wireless device setting.

Wireless devices can learn information about client devices during a pre-association discovery process. Before associating with the wireless device, client devices seeking specific services can initiate a pre-association discovery process in order to find out about the services provided by the wireless device, other client devices associated with the wireless device, or by a basic service set (BSS) in general. For example, the Application Services Platform (ASP) protocol as defined in IEEE 802.11aq, Generic Advertisement Service (GAS), can serve as protocols used for pre-association service discovery. The information obtained by the wireless device during service discovery request and/or responses can allow the wireless device to learn the specific services/application the client device will be using.

Additionally, the wireless device can report its compatibility to the client devices. This can be done, for example, with adaptive resource allocation using an information element (IE) in a Beacon and Probe Response (BPR). For example, the IE may include an indicator of the device type (or kind) of the wireless device, and/or it may indicate the behavior of the wireless device. The behavior, such as duty cycle or memory needed, may be used to classify or designate the wireless device as a certain device type and/or to associate the wireless device with a certain VAP with matching resources. The client devices can similarly notify the wireless device about the client device's behavior by sending a message to the AP, where the message may include, at least in part, an information element (IE) and/or a Probe Request. A probe request can refer to a special frame sent by the client device requesting information from the AP. In some embodiments, the Probe Request and/or Probe Response may include information about a service requested by the client device, and the IE may be used to map the client device to a client device type based on the service requested. The client device type may be associated with a designated virtual access point (VAP). In some embodiments, a VAP may be associated with a single device type, yet in other embodiments a VAP may be associated with multiple device types.

Another way that a wireless device can learn information about client devices can be during authentication and association procedures. Client devices that wish to connect to an IoT network may need to be authenticated and then associate with a wireless device. During the authentication and association procedure, the wireless device can learn some of the client device capabilities, including for example, the maximum data rate supported by the client device. In one embodiment, GAS exchanges can be used in conjunction with authentication and association procedures to further learn of services supported by the client device.

In order to agree on a pre-determined behavior pattern between the wireless device and the client device, the client device can describe its own desired behavior using an IE in an Association Request to the wireless device. In some embodiments, the IE may include information that designates the client device as a certain kind or type of device. For example the IE may include a field that indicates that the client device is a smart television, thermostat, receiver, speaker, camera, laptop, light switch, lightbulb, or a sensor. The wireless device can report where it will use the collected information from the client device by sending a message to the client device, where the message may include, at least in part, an IE in an Association Response to the client device. The IE may be used to map the client device to a client device type. The client device type may be associated with a virtual access point (VAP).

The information determined by the wireless device and/or the client device can include, for example: traffic type/data rate/duty cycle; power-save capabilities; and continuous connection vs. intermittent connection preferences. In some embodiments, the wireless device may be operating on the expectation that the client device will use connect-send/data-disconnect cycles instead of maintaining a constant connection with the wireless device. For such client devices, the wireless device may provide the service of maintaining the data between connections in memory.

In various embodiments, client device types can be defined and used for the categorization of the myriad of IoT client devices in order to classify them, for example, based on the client device's resource requirements. For example, a first client device, may require a smaller buffer space and lower latency, than a second device type requiring a larger buffer allocation and medium latency tolerance.

As explained above, the behavior, or more particularly, a profile associated with packets (traffic) sent between a server hosting a service and a processor executing an application on the client devices can be determined by a wireless device. That is, the server may be storing information in a database or repository that may be used by the executing application on the client devices to generate a result for a user of the client device. The AP device may be a proxy device responsible for routing packets or switching frames, received from the server, via a network that the server and the AP device are connected to, to the client devices, and vice versa. The network connecting the server to the AP device may be a network operated by an Internet Service Provider (ISP) and therefore the ISP may shape the traffic between the server and the client device based on the traffic type, which is based at least in part on the application or type of application executing on the client devices, the data rate, which is based at least in part on the application or type of application executing on the client devices and the hardware capabilities of a radio in the client devices, and/or duty cycle, which is based at least in part on the application or type of application execution on the client devices. The shape of the traffic between the server and the client devices may also be based at least in part on the power saving capabilities of some of the client devices. For example, a wearable client device such as a wristwatch may enter into a lower power mode periodically, wherein a radio in the wristwatch enters into a lower power mode in which packets or frames are not transmitted between the AP device and the wristwatch. As a result, the shape of the traffic of the wristwatch may be periodic, that is there may be a plurality of packets or frames transmitted between the server and the wristwatch during a first period of time, and during a second period of time no packets or frames, or a reduced number of packets or frames, may be exchanged between the server and the wristwatch. In this example, the volume of packets or frames in the first period may be greater than the volume of packets for frames in the second period, and processors in the AP device may determine this difference in the volume of packets or frames.

The AP device may also determine a connection type (e.g., a continuous connection or an intermittent connection) associated with the client devices based on one or more fields in packets exchanged between the server and the client devices indicating whether the connection type. Each connection type may require signaling to setup, maintain, and/or terminate (tear down) a connection between the server and the client devices, and the signaling may be optimized between the server and the client devices. The AP device may determine, based on an analysis of the signaling exchanges between the server and client devices, that the signaling becomes optimized over a period of time. For example, if the server and one or more of the client devices use a signaling protocol to maintain a connection between a port on the server exchanging information with a port on one or more of the client devices, that is normally used for higher bandwidth applications, but either the server, AP device, or the one or more client devices determines that the bandwidth requirements for applications executing on the one or more client devices is less than that of the de facto bandwidth allocation for higher bandwidth applications, the server and the one or more client devices may modify or alter a parameter associated with the signaling protocol to reduce the number of exchanges necessary to maintain the connection. This may be done, because for lower bandwidth applications, a connection between the server and the applications executing on the one or more client devices require less bandwidth than higher bandwidth applications and therefore the frequency with which packets or frames need to be exchanged between the server and the one or client devices will be less than the frequency with which packets or frames are exchanged between the server and the one or more client devices executing higher bandwidth applications. In other words, if the frequency with which packets or frames are being exchanged on a connection is higher than or less than a default value for a keep alive connection parameter (i.e., the frequency with which packets or frames comprising messages need to be exchanged to maintain a connection) the server, AP device, or client devices may adjust the keep alive connection parameter to optimize (increase the efficient use of available bandwidth) bandwidth allocated for the exchange of packets or frames between the server and the client devices. Consequently, in this example, the signaling protocol may be optimized with respect to the bandwidth consumed to keep a connection alive between the server and the client devices. The processors in the AP device may generate a profile corresponding to other traffic shapes associated with other client devices (e.g., other wearables) that have a traffic shape similar to that of the wristwatch, and may instantiate a virtual MAC layer entity, and in some embodiments a corresponding network layer entity, to manage the exchange of packets between servers hosting content and/or services that is consumed or used, respectively, by the client devices with the profile corresponding to the traffic shapes of wearables. A profile may be used to determine a client device type, as illustrated in FIG. 4, of client devices with the profile. The processors may create buffer space in physical or virtual memory and/or partition physical or virtual data queues, and may associate the buffer space or data queues with a client device type associated with a particular profile. The virtual MAC layer entity may utilize the created buffer space and partitioned data queues to send and receive packets and/or frames between the client devices of a certain client device type to the corresponding servers hosting content and/or services that is consumed or used, respectively, by the client devices classified by the client device type. The virtual MAC, created buffer space, and the portioned data queues may be referred to as a virtual access point (VAP). The processors may generate a plurality of VAPs based on the profile of traffic exchanged between the servers and the client devices, and may assign the client devices classified according to a certain client device type to a VAP based at least in part on the resources required by the client devices as described below with reference to FIGS. 5-7.

Figure 5:
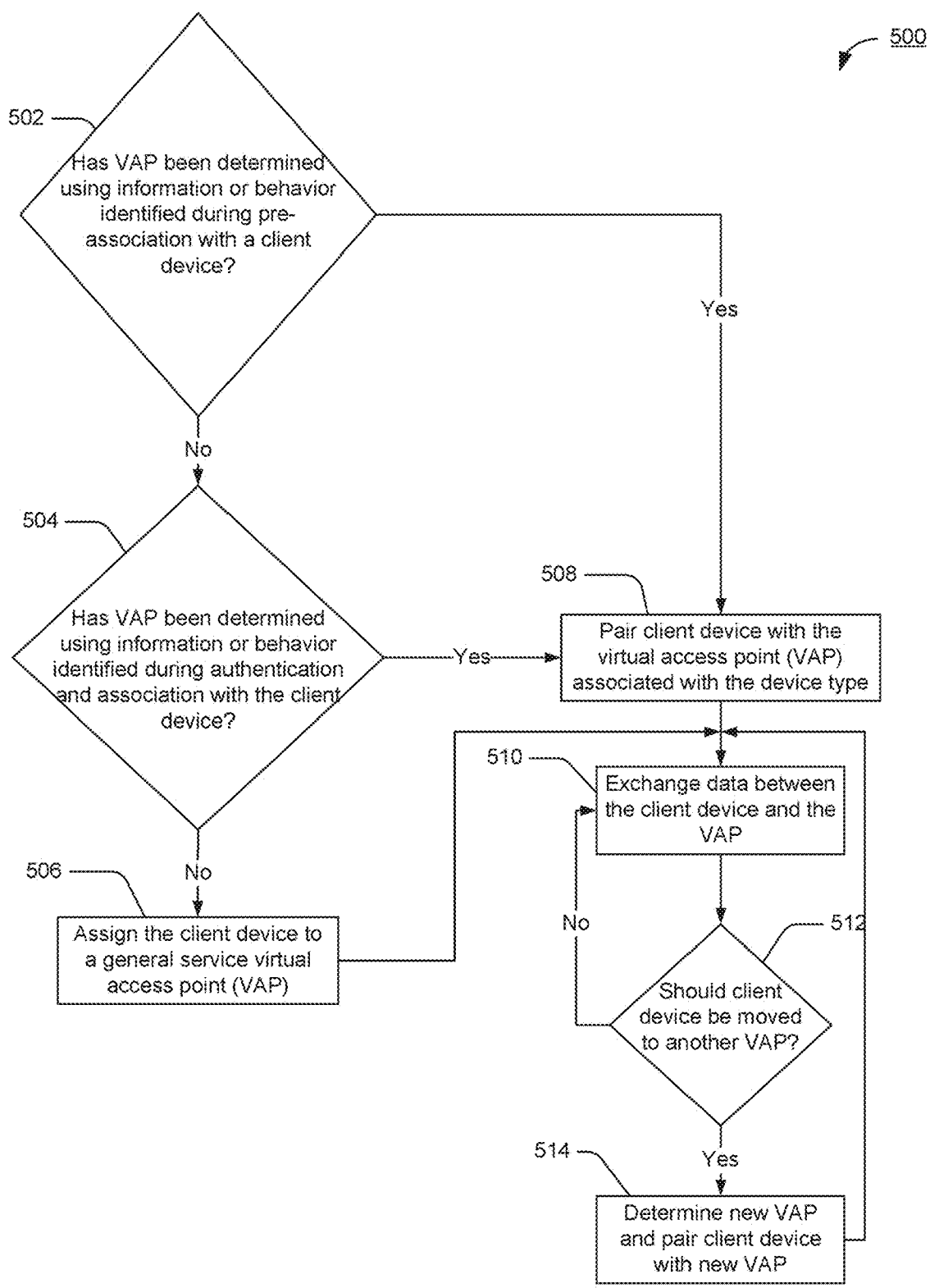
FIG. 5 shows an exemplary flowchart of the operation of pairing a VAP with a client device based on services offered by the VAP, in accordance with one or more example embodiments of the disclosure.

FIG. 5 shows an exemplary flowchart of the operation of pairing a VAP with a client device based on services offered by the VAP, in accordance with one or more example embodiments of the disclosure. Method 500 may correspond to a series of steps that may occur in the order depicted in method 500 or in another order, and may correspond to computer-executable instructions that may be executed by one or more processors and/or one or more other hardware components (e.g., connectivity optimization entity 911) in exemplary communication station 1000 which may be representative of the AP devices disclosed herein. Exemplary wireless device 301, and more particularly connectivity optimization entity 350, may implement the instructions in blocks 502-514.

At block 502, one or more processors, or a connectivity optimization entity, may determine if a device type of a client device has been identified during pre-association with a client device, using information or behavior identified during pre-association with a client device (e.g., thermostat 206). The one or more processors, or the connectivity optimization entity, may determine if the device type of the client device has been identified during pre-association in accordance with the steps in FIG. 6. Client devices seeking specific services, may initiate pre-association discovery to determine which services may be provided by a virtual access point (VAP) from the connectivity optimization entity. The client devices may determine the services provided by the VAP from requests (beacons) and/or probe responses of the Application Services Platform (ASP) protocol, IEEE 802.11 aq, and/or Generic Advertisement Services (GAS). Data carried in the requests and/or responses may include data that is necessary for the client device to determine what specific services and/or applications that the VAP provides. The connectivity optimization entity may implement the pre-association steps outlined in FIG. 6. If the connectivity optimization entity identifies a device type of the client device during pre-association with the client device, the method may progress to block 508 and the connectivity optimization entity may pair the client device with a VAP associated with the device type. If the connectivity optimization entity does not identify d device type of the client device during pre-association with the client device, the method may progress to block 504. At block 504, the connectivity optimization entity may determine if a device type of the client device has been identified during authentication and association with the client device. The one or more processors, or the connectivity optimization entity, may determine if the device type of the client device has been identified during authentication and association in accordance with the steps in FIG. 7. In some embodiments, there may be an association request which may include a service set identifier (SSID) field in a frame carrying the association request that is associated with a VAP that the client device wants to associate with. The SSID field may contain a value corresponding to a number uniquely identifying a service set of devices comprising the VAP and the client device that wants to associate with the VAP. Further still in some embodiments, the frame may include a supported rates and basic service set (BSS) Membership Selectors field, an extended supported rates and BSS Membership Selectors field, a power capability field, a supported channels field, a robust security network (RSN) field, a quality of service (QoS) capability field, a radio measurement (RM) enabled capabilities field, a mobility domain field, a supported operating classes field, a high throughput (HT) capabilities field, a BSS coexistence field, an extended capabilities field, a QoS traffic capability field, a traffic identification map (TIM) broadcast request field, an interworking field, a multi-band field, a directional multi-gigabit (DMG) capabilities field, a multiple MAC sublayers field, a very high throughput (VHT) capabilities field, an operating mode notification field, and/or a vendor specific field.

In some embodiments, the VAP may receive an authentication request prior to receiving the association request. For example, the VAP may comprise a port access entity (PAE), that controls the forwarding of data (e.g., frames) to and from a MAC layer hardware entity in the AP, may implement an authenticator PAE and Extensible Authentication Protocol (EAP), and the client device may comprise a PAE also that implements a supplicant PAE and EAP. The PAE in the VAP may authenticate the PAE in the client device, by using the EAP to enable an authentication server (AS) to authenticate the client device using a robust security network association (RSNA) procedure. After identifying the authentication/association request from the client, the VAP may initiate authentication/association with the client device and the method may progress to block 508. If the connectivity optimization entity does not identify a device type of the client device during the authentication and association with the client device, the method may progress to block 506 and the connectivity optimization entity may assign the client device to a general service AP. After the client device is assigned to a general service VAP, the method may progress to block 510. Returning to block 508, after the connectivity optimization entity pairs the client device with a VAP associated with the device type the method may progress to block 510 and the connectivity optimization entity may exchange data between the client device and the VAP. The method may then progress to block 512, and the connectivity optimization entity may determine if a client device has been moved to another VAP. If the client device has not been moved to another VAP, the method may return to block 510, and the connectivity optimization entity may cause the VAP to continue to exchange data with the client device. The connectivity optimization entity may learn the behavior of a client device over time, and determine if the client device should be moved to another VAP. If the connectivity optimization entity determines that the client device should be moved to another VAP the connectivity optimization entity may determine a new VAP, at block 514, and may move (assign) the client device to the new VAP. The method may the progress to block 508 and the connectivity optimization entity may pair the client device with the new VAP. It should be noted that the new VAP may be associated with a different device type since each VAP may be associated with a unique device type.

Figure 6:
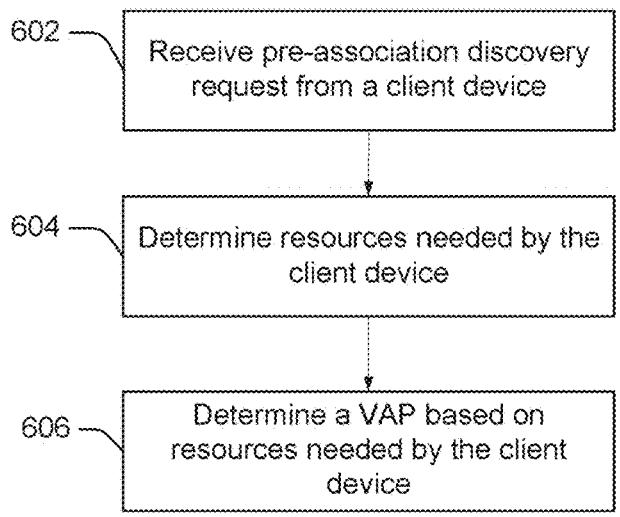
FIG. 6 shows an exemplary flowchart of the operation of pre-association discovery between a VAP and a client device, in accordance with one or more example embodiments of the disclosure.

FIG. 6 shows an exemplary flowchart of the operation of pre-association discovery between a VAP and a client device, in accordance with one or more example embodiments of the disclosure. Method 600 may correspond to a series of steps that may occur in the order depicted in method 600 or in another order, and may correspond to computer-executable instructions that may be executed by one or more processors and/or one or more other hardware components (e.g., connectivity optimization entity 911) in exemplary communication station 1000 which may be representative of the AP devices disclosed herein. At block 602, a connectivity optimization entity, may receive a pre-association discovery request from a client device such as a ASP, 802.11 aq, or GAS pre-association discovery request. At block 604, the connectivity optimization entity may determine resources needed by the client device. For example, the resources needed may be based at least in part on an indicated device type, indicated behavior, and/or a requested service. At block 606 the connectivity optimization entity may determine a VAP base at least in part on resources needed by the client device.

Figure 7:
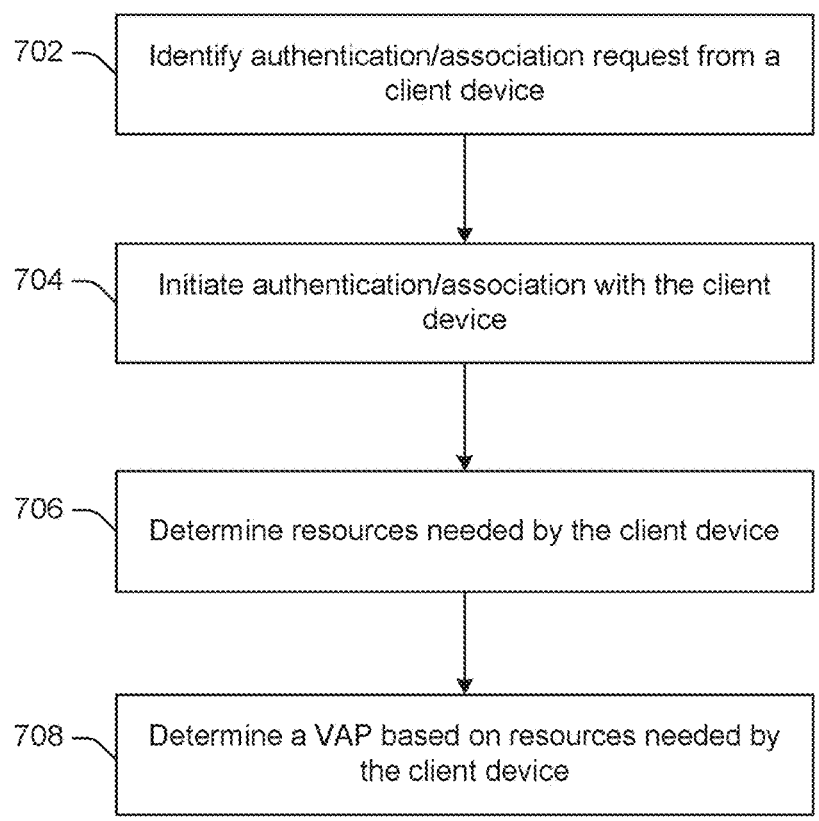
FIG. 7 shows an exemplary flowchart of the operation of authentication/association between a VAP and client device, in accordance with one or more example embodiments of the disclosure.

FIG. 7 shows an exemplary flowchart of the operation of pre-association discovery between a VAP and a client device, in accordance with one or more example embodiments of the disclosure. Method 700 may correspond to a series of steps that may occur in the order depicted in method 700 or in another order, and may correspond to computer-executable instructions that may be executed by one or more processors and/or one or more other hardware components (e.g., connectivity optimization entity 911) in exemplary communication station 1000 which may be representative of the AP devices disclosed herein. At block 702, a connectivity optimization entity may identify an authentication/association request from a client device (e.g., thermostat 206). In some embodiments, the association request may include a service set identifier (SSID) field in a frame carrying the association request that is associated with the VAP that the client device wants to associate with. The SSID field may contain a value corresponding to a number uniquely identifying a service set of devices comprising the VAP and the client device that wants to associate with the VAP. Further still in some embodiments, the frame may include a supported rates and basic service set (BSS) Membership Selectors field, an extended supported rates and BSS Membership Selectors field, a power capability field, a supported channels field, a robust security network (RSN) field, a quality of service (QoS) capability field, a radio measurement (RM) enabled capabilities field, a mobility domain field, a supported operating classes field, a high throughput (HT) capabilities field, a BSS coexistence field, an extended capabilities field, a QoS traffic capability field, a traffic identification map (TIM) broadcast request field, an interworking field, a multi-band field, a directional multi-gigabit (DMG) capabilities field, a multiple MAC sublayers field, a very high throughput (VHT) capabilities field, an operating mode notification field, and/or a vendor specific field.

In some embodiments, the VAP may receive an authentication request prior to receiving the association request. For example, the VAP may comprise a port access entity (PAE), that controls the forwarding of data (e.g., frames) to and from a MAC layer hardware entity in the VAP, may implement an authenticator PAE and Extensible Authentication Protocol (EAP), and the client device may comprise a PAE also that implements a supplicant PAE and EAP. The PAE in the VAP may authenticate the PAE in the client device, by using the EAP to enable an authentication server (AS) to authenticate the client device using a robust security network association (RSNA) procedure. After identifying the authentication/association request from the client, the VAP may initiate authentication/association with the client device at block 704. At block 706, the VAP may determine resources needed by the client device. For example, the resources needed may be based, at least in part, on an indicated device type, indicated behavior, and/or a requested service. At block 708, the VAP may determine a VAP based on resources needed by the client device. The VAP may transmit information regarding how the VAP will use the information. The VAP may determine resource allocation.

Figure 8:
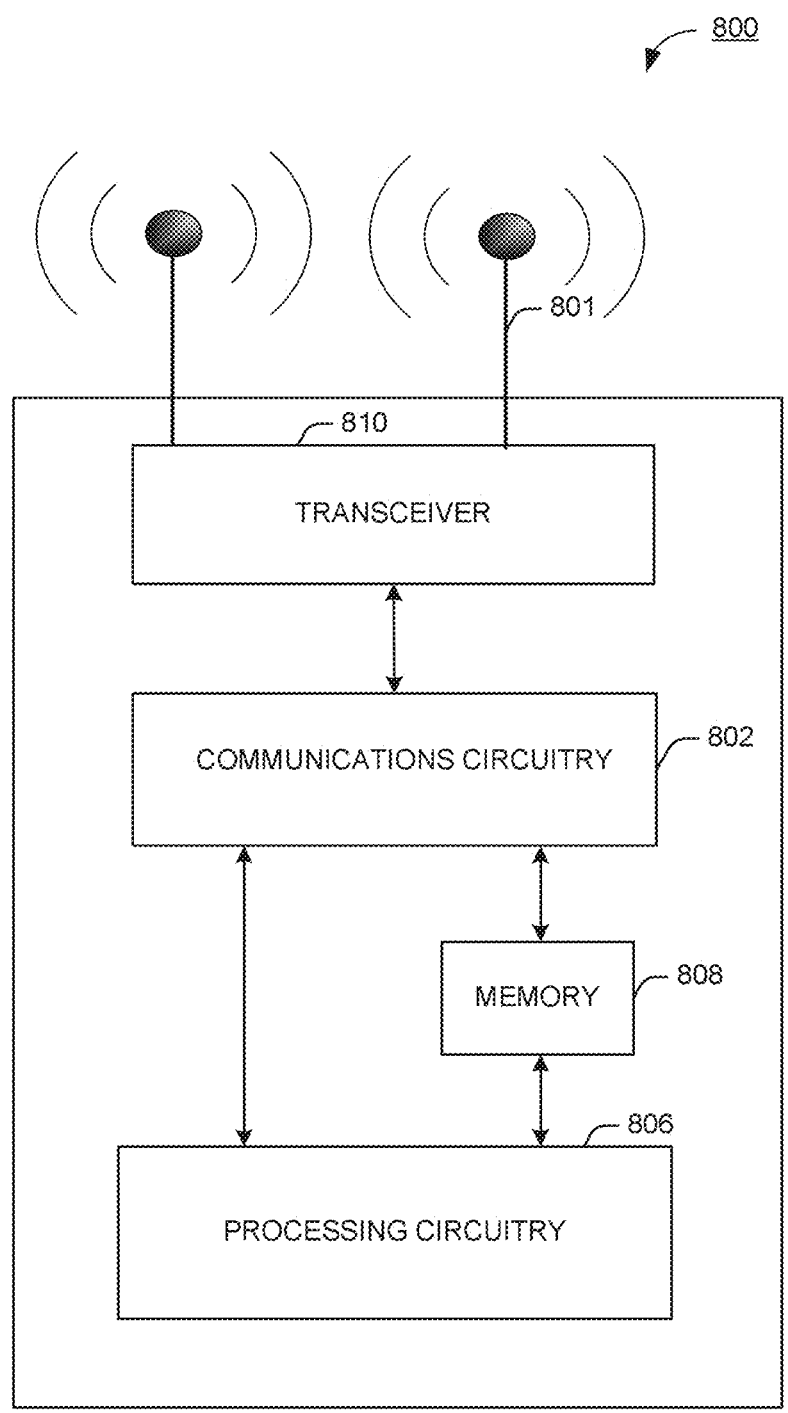
FIG. 8 illustrates a functional diagram of an example communication station that may be suitable for use as a user device, in accordance with one or more example embodiments of the disclosure.

FIG. 8 shows a functional diagram of an exemplary communication station 800 in accordance with some embodiments. In one embodiment, FIG. 8 illustrates a functional block diagram of a communication station that may be suitable for use as an AP 101 or communication station user device (e.g., smart television 120 in FIG. 1) in accordance with some embodiments. The communication station 800 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in FIGS. 5-7.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device may, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1000 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

Figure 9:
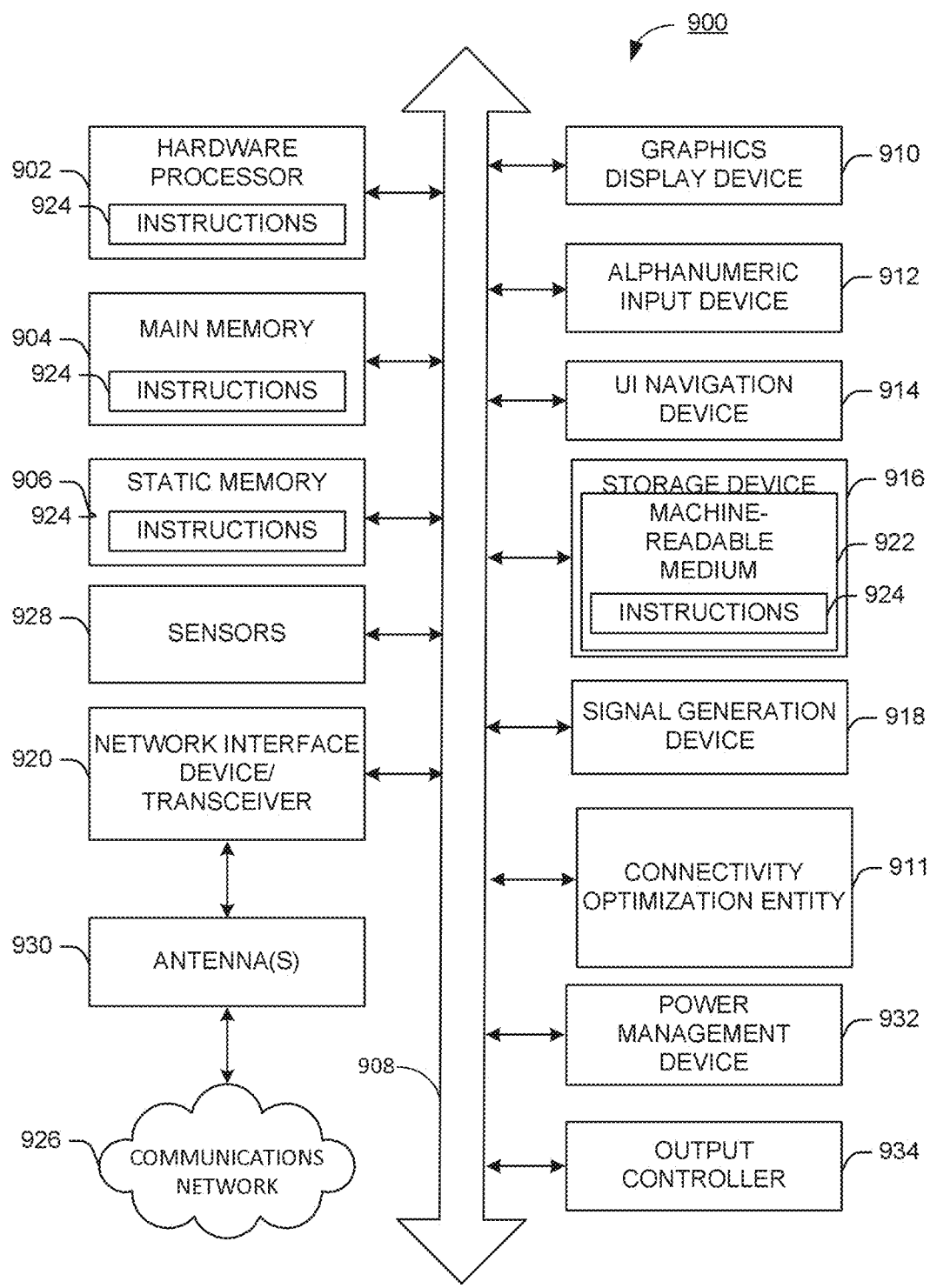
FIG. 9 is a block diagram of an example machine upon which any of one or more techniques (e.g., methods) may be performed, in accordance with one or more embodiments of the disclosure.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module.

For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), an adaptive resource management device 919, a network interface device/transceiver 920 coupled to antenna(s) 930, and one or more sensors 928, such as a global positioning system (GPS) sensor, compass, accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

Connectivity optimization entity 911 may be configured to execute instructions to determine first information received from a client device, wherein the first information comprises at least one of an authentication request, an association request, or pre-association discovery request, and wherein the first information includes an indication of a first device type; determine a first virtual access point from a group of virtual access points of the wireless device that corresponds to the first device type; associate the client device with the first virtual access point, wherein the first virtual access point allocates first wireless resources to the client device based at least in part on the device type; and cause to send to the client device data based at least in part on the first wireless resources.

It is understood that the above are only a subset of what the connectivity optimization entity 911 may be configured to perform and that other functions included throughout this disclosure may also be performed by connectivity optimization entity 911.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to a communications network. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In some example embodiments of this disclosure, there may be a wireless device, comprising: memory and processing circuitry configured to: determine first information received from a client device, wherein the first information comprises at least one of an authentication request, an association request, or pre-association discovery request, and wherein the first information includes an indication of a first device type; determine a first virtual access point from a group of virtual access points associated with the wireless device based at least in part on the first device type, wherein the first virtual access point has first wireless resources; associate the client device with the first virtual access point; and cause to send to the client device data based at least in part on the first wireless resources.

Implementations of the device may include the following features. The client device may be one of a media center, thermostat, lightbulb, light switch, television, laptop, camera, garage door, door, or speaker. The first wireless resources may comprise at least one of a buffer space, an over-the-air occupancy, an over-the-air congestion, or an over-the-air time reservation. The processing circuitry may be further configured to determine the first device type based at least in part on an indication of resource consumption behavior by the client device received in the first information from the client device. The processing circuitry may be further configured to determine one or more of traffic type, data rate, duty cycle, power saving capabilities, connection type, or signaling optimizations of the client device. The processing circuitry may be further configured to: determine the first device type based at least in part on an information element (IE) received in the first information from the client device. The processing circuitry may be further configured to: transfer the first client device from the first virtual access point to a second virtual access point from the group of virtual access points. The processing circuitry may be further configured to: determine second information received from a second client device, wherein the second information comprises at least one of a second authentication request, a second association request, or a second pre-association discovery request, and wherein the second information includes a second indication of a second device type; determine a second virtual access point from the group of virtual access points of the wireless device that corresponds to the second device type; associate the second client device with the second virtual access point, wherein the second virtual access point allocates second wireless resources to the second client device based at least in part on the second device type; and cause to send to the second client device data based at least in part on the second wireless resources. The device may further comprise: a transceiver configured to transmit and receive wireless signals; and an antenna coupled to the transceiver. The second wireless resources may be different from the first wireless sources.

In some embodiments of this disclosure, there may be a non-transitory computer-readable medium storing computer-executable instructions which, when executed by a processor, cause the processor to perform operations comprising: determining first information received from a client device, wherein the first information comprises at least one of an authentication request, an association request, or pre-association discovery request, and wherein the first information includes an indication of a first device type; determining a first virtual access point from a group of virtual access points associated with the wireless device based at least in part on the first device type, wherein the first virtual access point has first wireless resources; associating the client device with the first virtual access point, wherein the first virtual access point allocates first wireless resources to the client device based at least in part on the device type; and causing to send to the client device data based at least in part on the first wireless resources.

Implementations of the non-transitory computer-readable medium may include the following features. The client device may be at least one of a media center, thermostat, lightbulb, light switch, television, laptop, camera, garage door, door, or speaker. The first wireless resources may comprise at least one of a buffer space, an over-the-air occupancy, an over-the-air congestion, or an over-the-air time reservation. The data may be low latency data or latency tolerant data. The processing circuitry may be further configured to determine one or more of a wakeup cycle traffic type, data rate, duty cycle, power saving capabilities, connection type, or signaling optimizations of the client device. The processing circuitry may be further configured to: determine the first device type based at least in part on an information element (IE) received in the first information from the client device. The processing circuitry may be further configured to: transfer the first client device from the first virtual access point to a second virtual access point from the group of virtual access points. The processing circuitry may be further configured to: determining second information received from a second client device, wherein the second information comprises at least one of a second authentication request, a second association request, or a second pre-association discovery request, and wherein the second information includes a second indication of a second device type; determining a second virtual access point from the group of virtual access points of the wireless device that corresponds to the second device type; associating the second client device with the second virtual access point, wherein the second virtual access point allocates second wireless resources to the second client device based at least in part on the second device type; and causing to send to the second client device data based at least in part on the second wireless resources.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A wireless device, comprising:
memory and processing circuitry configured to:
determine first information received from a client device, wherein the first information comprises at least one of an authentication request, an association request, or pre-association discovery request, wherein the first information includes an indication of a first device type, the indication of the first device type is based at least in part on a traffic pattern of the client device;
determine second information received from a second client device, wherein the second information comprises at least one of a second authentication request, a second association request, or a second pre-association discovery request, and wherein the second information includes a second indication of a second device type, and the indication of the second device type is based at least in part on a sleep pattern of the second client device;
determine a first connection type associated with the first device type;
determine a second connection type associated with the second device type, wherein the first connection type and the second connection type are associated with a continuous connection based on the traffic pattern of the client device or an intermittent connection based on the sleep pattern of the of the second client device;
determine a first virtual access point from a group of virtual access points associated with the wireless device based at least in part on the first device type, wherein the first virtual access point comprises a first set of services, and first wireless resources are associated with the first set of services;
associate the client device with the first virtual access point based on the set of services and based on the traffic pattern of the client device;
determine a second virtual access point from the group of virtual access points based at least in part on the second device type;
associate the second client device with the second virtual access point based at least in part on the sleep pattern of the second client device; and
cause to send to the client device data based at least in part on the first wireless resources.

2. The wireless device of claim 1, wherein the client device is one of a media center, thermostat, lightbulb, light switch, television, laptop, camera, garage door, door, or speaker.

3. The wireless device of claim 1, wherein the first wireless resources comprise at least one of an over-the-air occupancy, an over-the-air congestion, or an over-the-air time reservation.

4. The wireless device of claim 1, wherein the processing circuitry is further configured to:
determine one or more of duty cycle, power saving capabilities or signaling optimizations of the client device.

5. The wireless device of claim 1, wherein the processing circuitry is further configured to:
determine the first device type based at least in part on an information element (IE) received in the first information from the client device.

6. The wireless device of claim 1, wherein the processing circuitry is further configured to:
transfer the first client device from the first virtual access point to a second virtual access point from the group of virtual access points.

7. The wireless device of claim 1, wherein the processing circuitry is further configured to:
determine a second virtual access point from the group of virtual access points of the wireless device that corresponds to the second device type;
associate the second client device with the second virtual access point, wherein the second virtual access point allocates second wireless resources to the second client device based at least in part on the second device type; and
cause to send to the second client device data based at least in part on the second wireless resources.

8. The device of claim 7, wherein the second wireless resources are different from the first wireless resources.

9. The device of claim 1, further comprising:
a transceiver configured to transmit and receive wireless signals; and
an antenna coupled to the transceiver.

10. A non-transitory computer-readable medium storing computer-executable instructions which, when executed by a processor, cause the processor to perform operations comprising:
determining first information received from a client device, wherein the first information comprises at least one of an authentication request, an association request, or pre-association discovery request, and wherein the first information includes an indication of a first device type, and wherein the indication of the first device type is based at least in part on a traffic pattern of the client device;
determine second information received from a second client device, wherein the second information comprises at least one of a second authentication request, a second association request, or a second pre-association discovery request, and wherein the second information includes a second indication of a second device type, and the indication of the second device type is based at least in part on a sleep pattern of the second client device;
determining a first connection type associated with the first device type;
determining a second connection type associated with the second device type, wherein the first connection type and the second connection type are associated with a continuous connection based on the traffic pattern of the client device or an intermittent connection based on the sleep pattern of the of the second client device;
determining a first virtual access point from a group of virtual access points associated with the wireless device based at least in part on the first device type, wherein the first virtual access point comprises a first set of services, and first wireless resources are associated with the first set of services;
associating the client device with the first virtual access point, wherein the first virtual access point allocates the first wireless resources to the client device based at least in part on the set of services and the traffic pattern of the client device;
determining a second virtual access point from the group of virtual access points based at least in part on the second device type;
associating the second client device with the second virtual access point based at least in part on the sleep pattern of the second client device; and
causing to send to the client device data based at least in part on the first wireless resources.

11. The non-transitory computer-readable medium of claim 10, wherein the client device is at least one of a media center, thermostat, lightbulb, light switch, television, laptop, camera, garage door, door, or speaker.

12. The non-transitory computer-readable medium of claim 10, wherein the first wireless resources comprises at least one of an over-the-air occupancy, an over-the-air congestion, or an over-the-air time reservation.

13. The non-transitory computer-readable medium of claim 10, wherein the data is low latency data or latency tolerant data.

14. The non-transitory computer-readable medium of claim 10, wherein the non-transitory computer-readable medium stores computer-executable instructions which, when executed by the processor, cause the processor to perform operations further comprising:
determining one or more of a wakeup cycle, duty cycle, power saving capabilities, or signaling optimizations of the client device.

15. The non-transitory computer-readable medium of claim 10, wherein the non-transitory computer-readable medium stores computer-executable instructions which, when executed by the processor, cause the processor to perform operations further comprising:
determining the first device type based at least in part on an information element (IE) received in the first information from the client device.

16. The non-transitory computer-readable medium of claim 10, wherein the non-transitory computer-readable medium stores computer-executable instructions which, when executed by the processor, cause the processor to perform operations further comprising:
transferring the first client device from the first virtual access point to a second virtual access point from the group of virtual access points.

17. The non-transitory computer-readable medium of claim 10, wherein the non-transitory computer-readable medium stores computer-executable instructions which, when executed by the processor, cause the processor to perform operations further comprising:
determining second information received from a second client device, wherein the second information comprises at least one of a second authentication request, a second association request, or a second pre-association discovery request, and wherein the second information includes a second indication of a second device type;

determining a second virtual access point from the group of virtual access points of the wireless device that corresponds to the second device type;

associating the second client device with the second virtual access point, wherein the second virtual access point allocates second wireless resources to the second client device based at least in part on the second device type; and causing to send to the second client device data based at least in part on the second wireless resources.

18. A method comprising:

determining first information received from a client device, wherein the first information comprises at least one of an authentication request, an association request, or pre-association discovery request, and wherein the first information includes an indication of a first device type, and wherein the indication of the first device type is based at least in part on a traffic pattern of the client device;

determining second information received from a second client device, wherein the second information comprises at least one of a second authentication request, a second association request, or a second pre-association discovery request, and wherein the second information includes a second indication of a second device type, and the indication of the second device type is based at least in part on a second resource consumption behavior of the second client device, and the second resource consumption behavior is based at least in part on a sleep pattern of the second client device;

determining a first connection type associated with the first device type;

determining a second connection type associated with the second device type, wherein the first connection type and the second connection type are associated with a continuous connection based on the traffic pattern of the client device or an intermittent connection based on the sleep pattern of the of the second client device;

determining a first virtual access point from a group of virtual access points associated with the wireless device based at least in part on the first device type, wherein the first virtual access point comprises a first set of services, and first wireless resources are associated with the first set of services;

associating the client device with the first virtual access point, wherein the first virtual access point allocates the first wireless resources to the client device based at least in part on the set of services and based on the traffic pattern of the client device;

determining a second virtual access point from the group of virtual access points based at least in part on the second device type;

associating the second client device with the second virtual access point based at least in part on the sleep pattern of the second client device; and causing to send to the client device data based at least in part on the first wireless resources.

19. The method of claim 18, the method further comprising:

determining a second virtual access point from the group of virtual access points of the wireless device that corresponds to the second device type;

associating the second client device with the second virtual access point, wherein the second virtual access point allocates second wireless resources to the second client device based at least in part on the second device type; and causing to send to the second client device data based at least in part on the second wireless resources.

* * * * *